United States Patent
Holmes et al.

(10) Patent No.: US 7,344,629 B2
(45) Date of Patent: Mar. 18, 2008

(54) SELECTABLE ION CONCENTRATIONS WITH ELECTROLYTIC ION EXCHANGE

(75) Inventors: Jim Holmes, South Lake Tahoe, CA (US); Eric Nyberg, Belmont, CA (US); Joe Evans, Palo Alto, CA (US)

(73) Assignee: Pionetics Corporation, San Carlos, CA (US)

( * ) Notice: Subject to any disclaimer, the term of this patent is extended or adjusted under 35 U.S.C. 154(b) by 769 days.

(21) Appl. No.: 10/637,186

(22) Filed: Aug. 8, 2003

(65) Prior Publication Data

US 2005/0029124 A1    Feb. 10, 2005

(51) Int. Cl.
B01D 61/44    (2006.01)
(52) U.S. Cl. .............. 204/536; 204/537; 204/538; 204/631; 204/632
(58) Field of Classification Search .......... 204/536, 204/537, 538, 631, 632
See application file for complete search history.

(56) References Cited

U.S. PATENT DOCUMENTS

| | | | |
|---|---|---|---|
| 2,829,095 A | 4/1958 | Oda | |
| 3,645,884 A | 2/1972 | Gilliland | |
| 3,654,125 A | 4/1972 | Leitz et al. | |
| 4,024,043 A | 5/1977 | Dege | |
| 4,032,452 A | 6/1977 | Davis | |
| 4,107,015 A | 8/1978 | Chlanda | |
| 4,465,573 A | 8/1984 | O'Hare | |
| 4,888,098 A | 12/1989 | Nyberg et al. | |
| 4,925,541 A | 5/1990 | Giuffrida et al. | |
| 5,007,989 A | 4/1991 | Nyberg et al. | |
| 5,019,235 A | 5/1991 | Nyberg et al. | |
| 5,762,774 A * | 6/1998 | Tessier | 204/524 |
| 5,788,826 A * | 8/1998 | Nyberg | 204/536 |

FOREIGN PATENT DOCUMENTS

| | | |
|---|---|---|
| CA | 2228886 | 8/1999 |
| EP | 0642824 | 3/1995 |
| EP | 1075868 | 2/2001 |
| WO | WO 02/079098 | 10/2002 |
| WO | WO 03/020404 | 3/2003 |

OTHER PUBLICATIONS

Webster's Ninth New Collegiate Dictionary, © 1991 by Merriam-Webster Inc., p. 283 ("contiguous").
ISR(Search Report) Jun. 12, 2004, WIPO.

* cited by examiner

*Primary Examiner*—Arun S. Phasge
(74) *Attorney, Agent, or Firm*—Janah & Associates; Ashok Janah

(57) ABSTRACT

An apparatus to treat an influent solution comprising ions to obtain a selectable ion concentration in an effluent solution. The apparatus comprises an electrochemical cell comprising a housing comprising first and second electrodes. A water-splitting ion exchange membrane is between the first and second electrodes, the membrane comprising ananion exchange surface facing the first electrode, and an cation exchange surface facing the second electrode, or vice versa. The housing also has an influent solution inlet and an effluent solution outlet with a solution channel that allows influent solution to flow past both the anion and cation exchange surfaces of the water-splitting ion exchange membrane to form the effluent solution. A variable voltage supply is capable of maintaining the first and second electrodes at a plurality of different voltages during an ion exchange stage.

24 Claims, 12 Drawing Sheets

FIG. 3
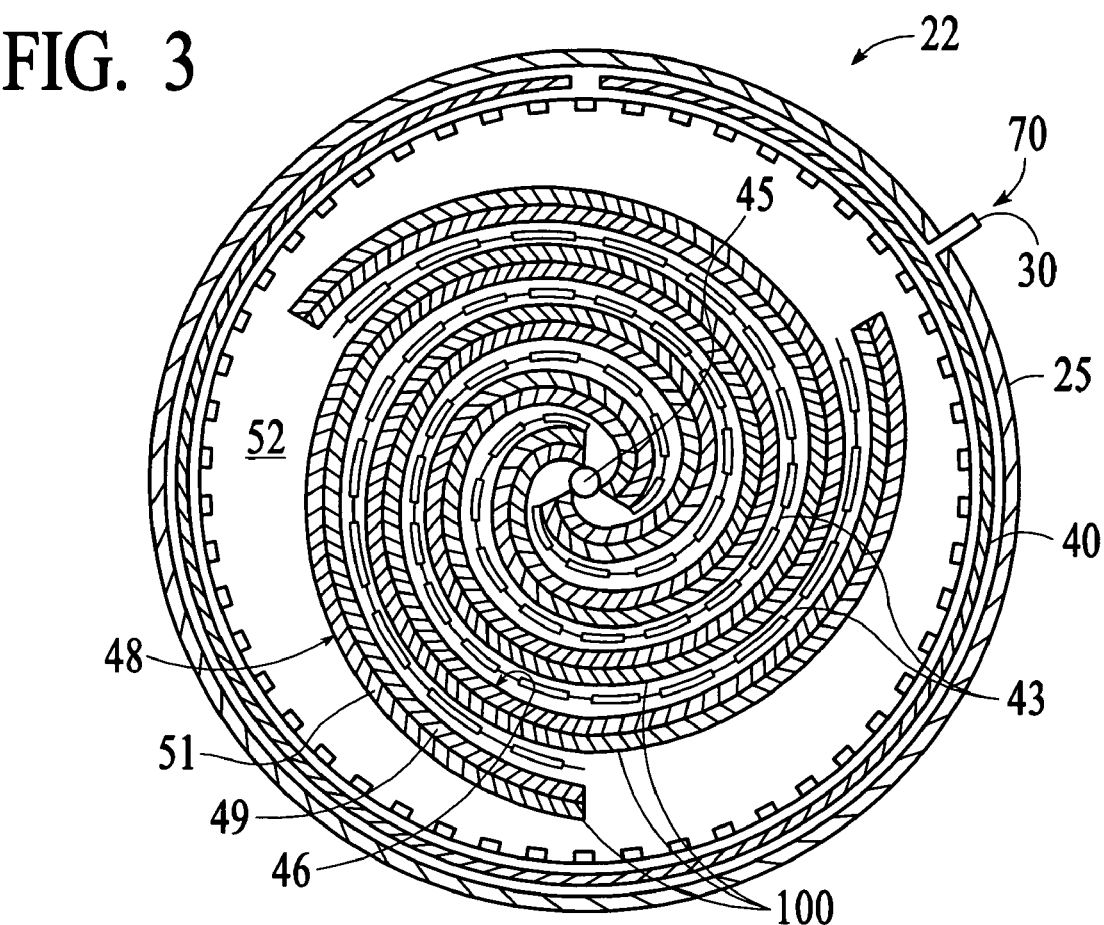
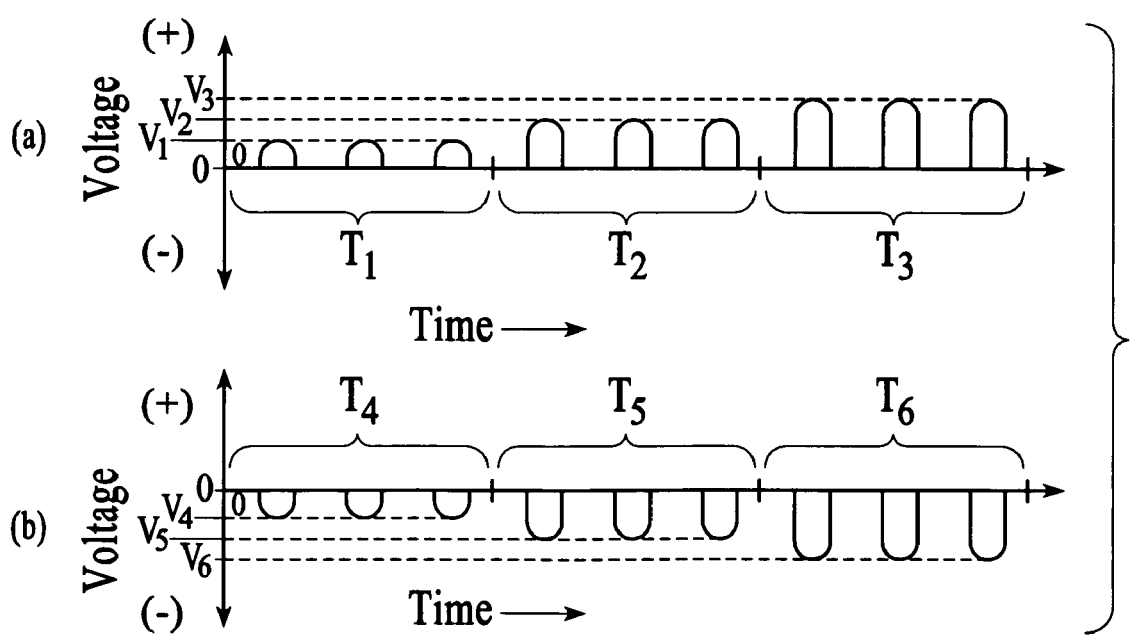
FIG. 4

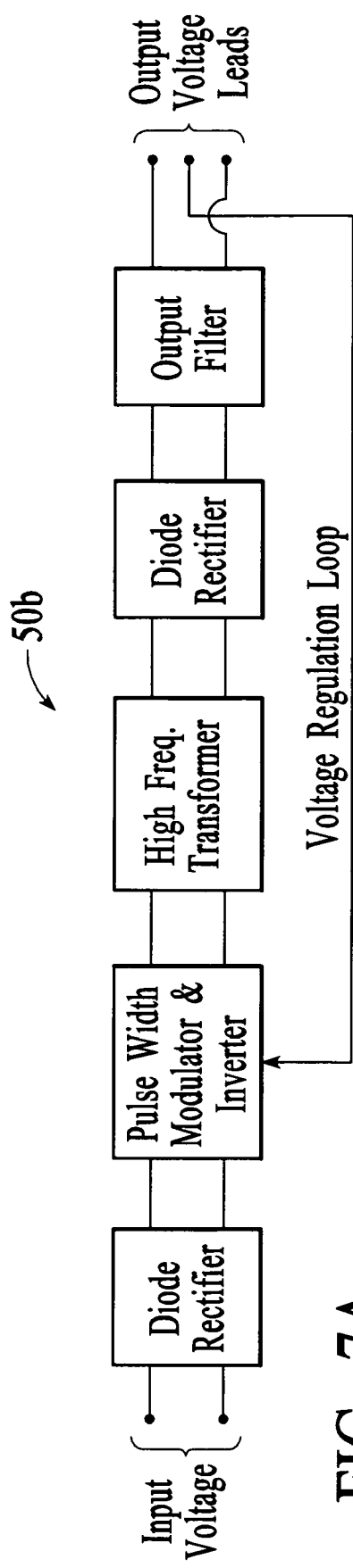
FIG. 7A
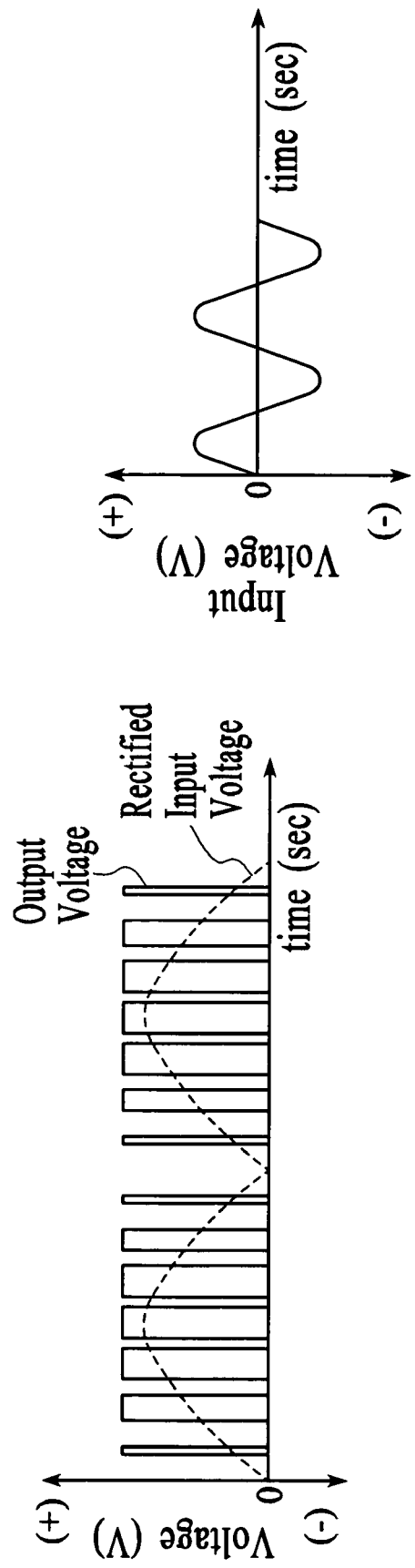
FIG. 7C
FIG. 7B

SELECTABLE ION CONCENTRATIONS WITH ELECTROLYTIC ION EXCHANGE

BACKGROUND

Embodiments of the invention relate to ion exchange processes and apparatus.

Ion exchange cells are used to remove or replace dissolved solids or ions in solutions. For example, ion exchange membranes and beads are used to deionize water to produce high purity drinking water by removing contaminant and other dissolved solids from a municipal wastewater streams. Ion exchange is also used for the selective substitution of ions in the treatment of industrial wastewater. In another example, tap water is softened by replacing hard divalent ions in tap water, such as calcium, with soft monovalent ions, such as sodium or potassium. Typically, ion exchange efficiency is measured by determining the total dissolved solids (TDS) content of a treated and untreated solutions and reported as a percentage reduction (% R).

Electrolytic assisted ion exchange improves ion extraction efficiency and provides easier regeneration of the ion exchange material in the cell. In such a system, an electric field is applied across a water-splitting ion exchange membrane, as described in commonly assigned U.S. Pat. No. 5,788,826 to Nyberg, which is incorporated herein by reference in its entirety. The water splitting membrane typically comprises a strong-acid cation exchange surface or layer (sulfonate groups; —$SO_3M$) and a strong-base anion exchange surface or layer (quaternary ammonium groups; —$NR_3A$). The membrane is positioned between electrodes so that its cation exchange surface faces the first electrode and its anion exchange surface faces the second electrode. During a deionization process cycle, a solution stream is passed through the cell while a predetermined voltage level is applied to the electrodes to generate an electric field normal to the surfaces of the water-splitting membrane. The electric field irreversibly dissociates water to split it into its component ions $H^+$ and $OH^-$ that migrate through the ion exchange layers in the direction of the electrode having an opposite polarity (e.g., $H^+$ migrates toward the negative electrode). The electric field assists the transport of the dissolved solid ions generated by the water-splitting reaction in a direction perpendicular to the membrane to provide a short pathway through the membrane. Thus, during deionization, the electric field is set at a single level that is sufficiently high to dissociate the water and effectively transport and remove a large majority of dissolved solids from the solution. The predetermined fixed field strength is generated by applying a single high DC voltage to the electrodes that maximizes ion extraction. Electrolytic ion exchange advantageously provides a uniform electric field in the cell that better utilizes the entire surface area of the membrane and that increases ion exchange efficiency to be able to remove 90% or more of the dissolved solids.

Electrolytic assisted ion exchange systems also allow electrical regeneration of the membranes, which is advantageous over conventional chemical regeneration processes. Conventional cation exchange layers are commonly regenerated using acidic solutions, such as sulfuric acid; and anion exchange layers are regenerated using basic solutions, such as sodium hydroxide. Regeneration is concluded with a rinsing step that removes entrapped regenerant solution. These chemical processes require large amounts of regenerating chemicals and/or water, and the cell has to be periodically shut down to allow the regeneration process. However, in electrolytic assisted ion exchange processes, the water-splitting membrane is regenerated by simply reversing the polarity of the voltage applied to electrodes to generate an inverted electric field that electrically regenerates the membranes by disgorging exchanged ions from the membrane. The reverse polarity voltage is also applied at a single voltage level that maximizes ion expulsion and/or rejection efficiency from the water splitting membrane during the regeneration cycle.

However, conventional electrolytic assisted ion exchange systems have several limitations. One limitation is that the TDS removal fraction can vary with influent solution quality and cell operating conditions. For example, a change in the flow rate or pressure of the influent solution can result in different fractions of dissolved solids being removed. The total dissolved solids content of the effluent solution also varies due to the TDS content of the influent solution changing with time, for example, the TDS of sewage changes drastically with heavy rains. As a result, an electrolytic cell that provides a 90% TDS reduction will generate a treated effluent solution having a TDS of 15 ppm from an influent solution having a TDS of 150 ppm, but when the influent solution contains 1500 ppm TDS, the treated effluent solution will have a TDS of 150 ppm. Such variations in the output TDS content are undesirable. Conventional electrolytic ion exchange cells also often exhibit a gradual increase in TDS content in the effluent solution, as the working ion exchange capacity of the membrane is consumed during deionization, which further increases the variability in effluent solution TDS content. The slow increase of ion concentration during batch deionization processes can cause the premature end of the deionization cycle, well before the capacity of the membrane is truly exhausted, increasing capital and operating costs for the cell. Thus, the output TDS content can vary significantly with influent TDS content and over time with conventional systems.

Furthermore, conventional electrolytic ion exchange systems also do not allow control of the ion concentration. While maximizing extraction of ions from a solution stream is desirable to purify water and de-ionized water in industrial applications, in some applications, it is desirable to maintain a predefined level of dissolved solids in the solution stream. For example, in drinking and cooking water applications, some dissolved solids are desirable so the water tastes better and does not taste synthetic. In other industrial water applications, it is also desirable to reduce the level of a particular ion in a wastewater stream, for example nitrate or arsenic ions, to meet an environmental standard. A particular ion level in a chemical solution can also be needed to provide precise control of the composition of the solution for industrial processes, for example, in cement manufacture and in electroplating solutions.

Thus, it is desirable to be able to treat influent solutions to provide uniform and consistent ion concentrations in the effluent solution, even if the quality or TDS of the influent solution varies over the treatment process. There is also a need for a water treatment system that can use electrical power for regeneration of ion exchange materials that uses electrical power rather than chemicals for regeneration to reduce or eliminate the inconvenience and environmental hazards associated with regenerant chemicals, and reduce rinse water volumes during cleaning cycles. It is also desirable to be able to treat influent solutions to maintain a predetermined or set level of dissolved solids in the treated solution.

SUMMARY

An apparatus to treat an influent solution comprising ions to obtain a selectable ion concentration in a resultant effluent solution. The apparatus comprises an electrochemical cell comprising a housing comprising first and second electrodes. A water-splitting ion exchange membrane is between the first and second electrodes, the membrane comprising a cation exchange surface facing the first electrode and an anion exchange surface facing the second electrode. The housing also has an influent solution inlet and an effluent solution outlet with a solution channel that allows influent solution to flow past both the anion and cation exchange surfaces of the water-splitting ion exchange membrane to form the effluent solution. A variable voltage supply is capable of maintaining the first and second electrodes at a plurality of voltage levels during an ion exchange stage. The ion exchange stage can be, for example, a deionization or ion removal step, or a membrane regeneration or ion rejection step.

In one version, the apparatus includes an ion meter to measure an ion concentration of the influent solution, at least partially treated influent solution, or effluent solution, and generate an ion concentration signal. A controller receives the ion concentration signal from the ion meter, and sends a control signal to the variable voltage supply to adjust the voltage level applied to the first and second electrodes in response to the ion concentration signal to achieve a predefined ion concentration range in the effluent solution.

In another aspect, a method of treating an influent solution comprising ions to control the concentration of ions in an effluent solution, is provided. The method comprises flowing the influent solution past both anion and cation exchange surfaces of a water-splitting ion exchange membrane to form the effluent solution; maintaining a time averaged electric field across the cation and anion exchange surfaces of the water-splitting membrane; and varying the strength of the time averaged electric field to control the ion concentration of the effluent solution.

DRAWINGS

These features, aspects, and advantages of the present invention will become better understood with regard to the following description, appended claims, and accompanying drawings which illustrate exemplary features of the invention:

FIG. 3 is a top view of the electrolytic ion exchange cell of FIG. 2;

FIG. 4 is a graph showing a variable time averaged voltage for an ion removal step (a) and an ion rejection (b);

Figure 5:
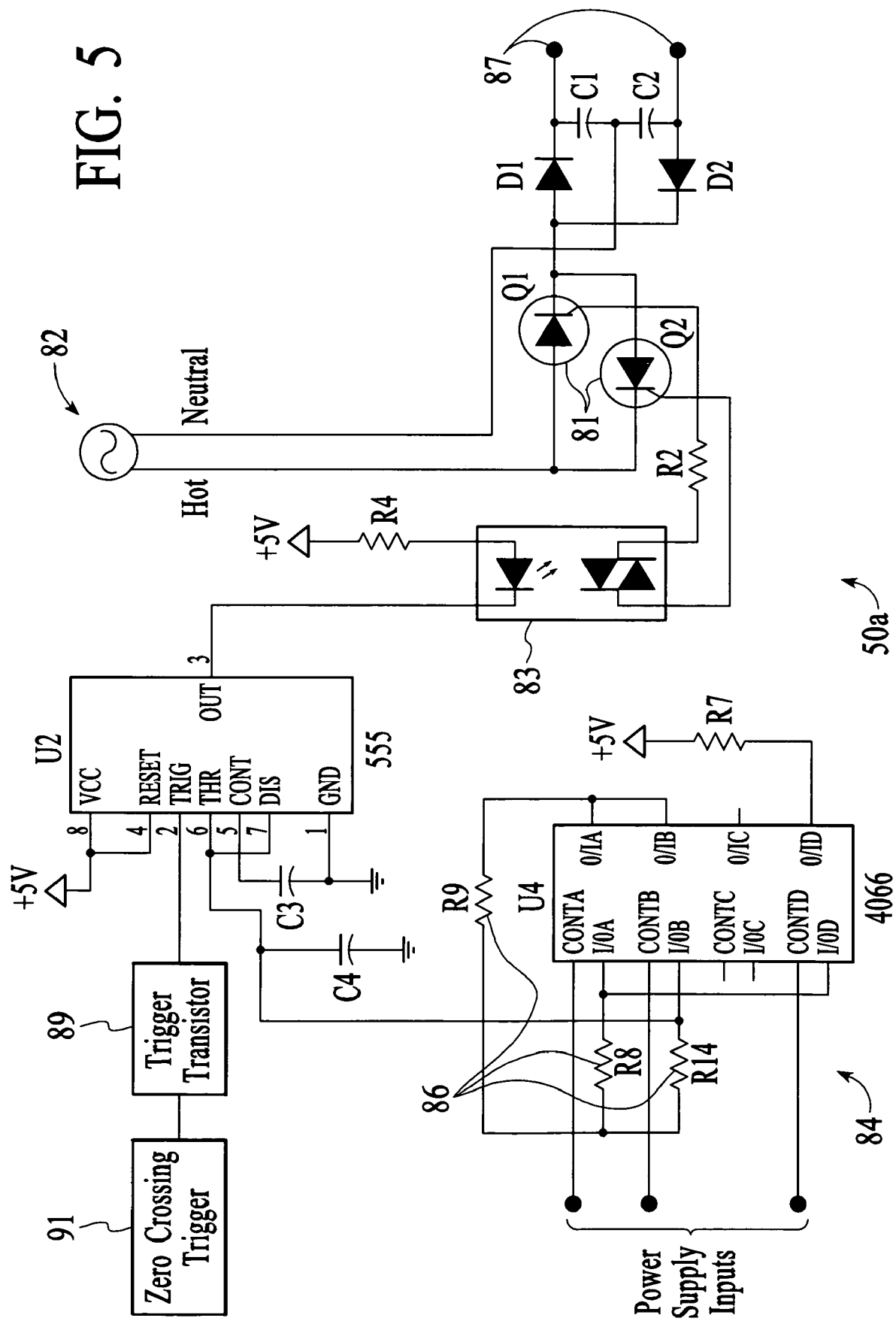
FIG. 5 is a circuit diagram of a variable voltage supply comprising a phase control voltage supply.
Figure 6A:
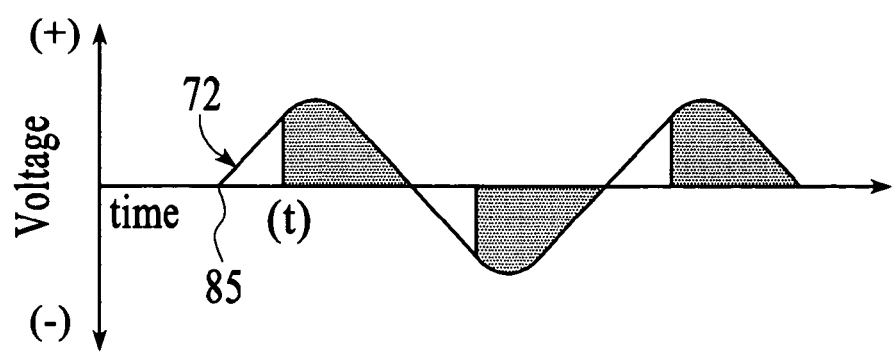
Figure 6B:
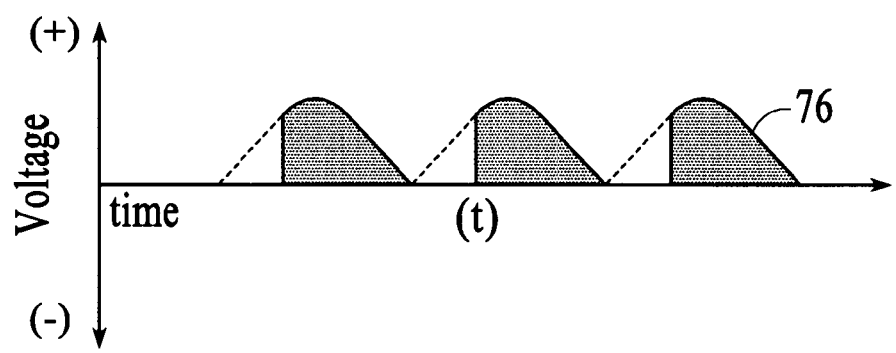
Figure 6C:
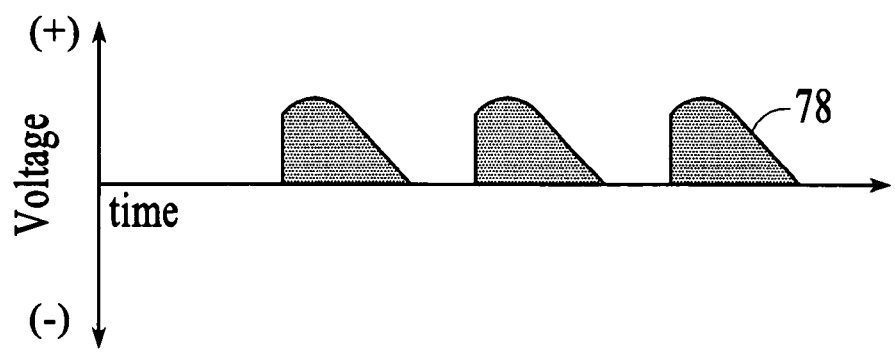
Figure 8:
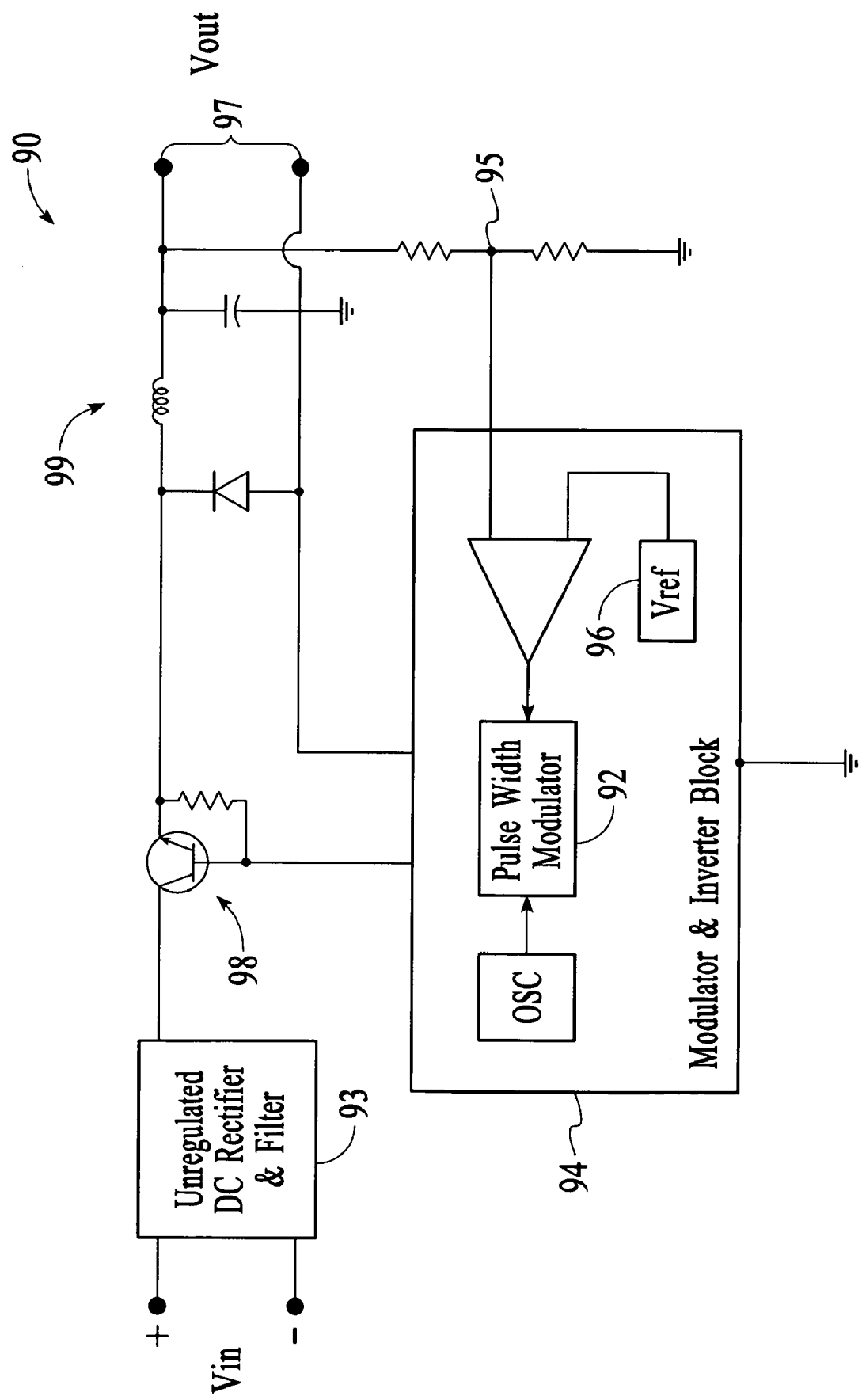
Figure 9:
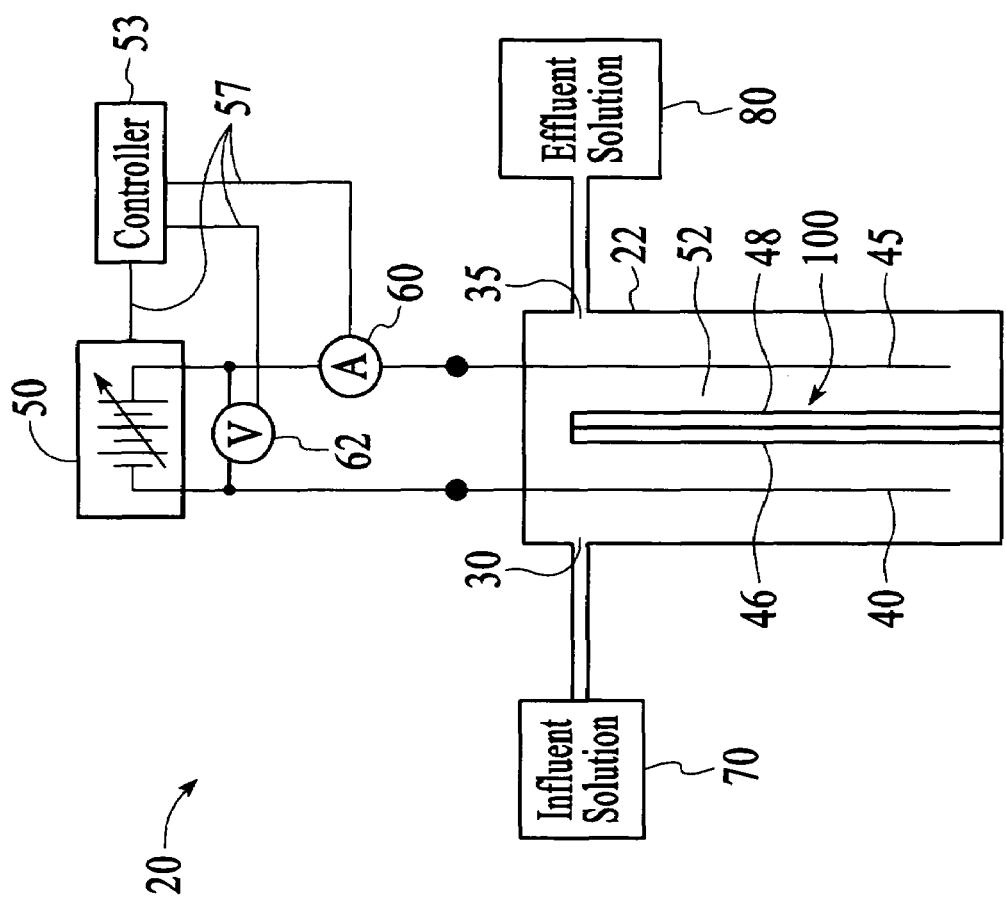
Figure 10A:
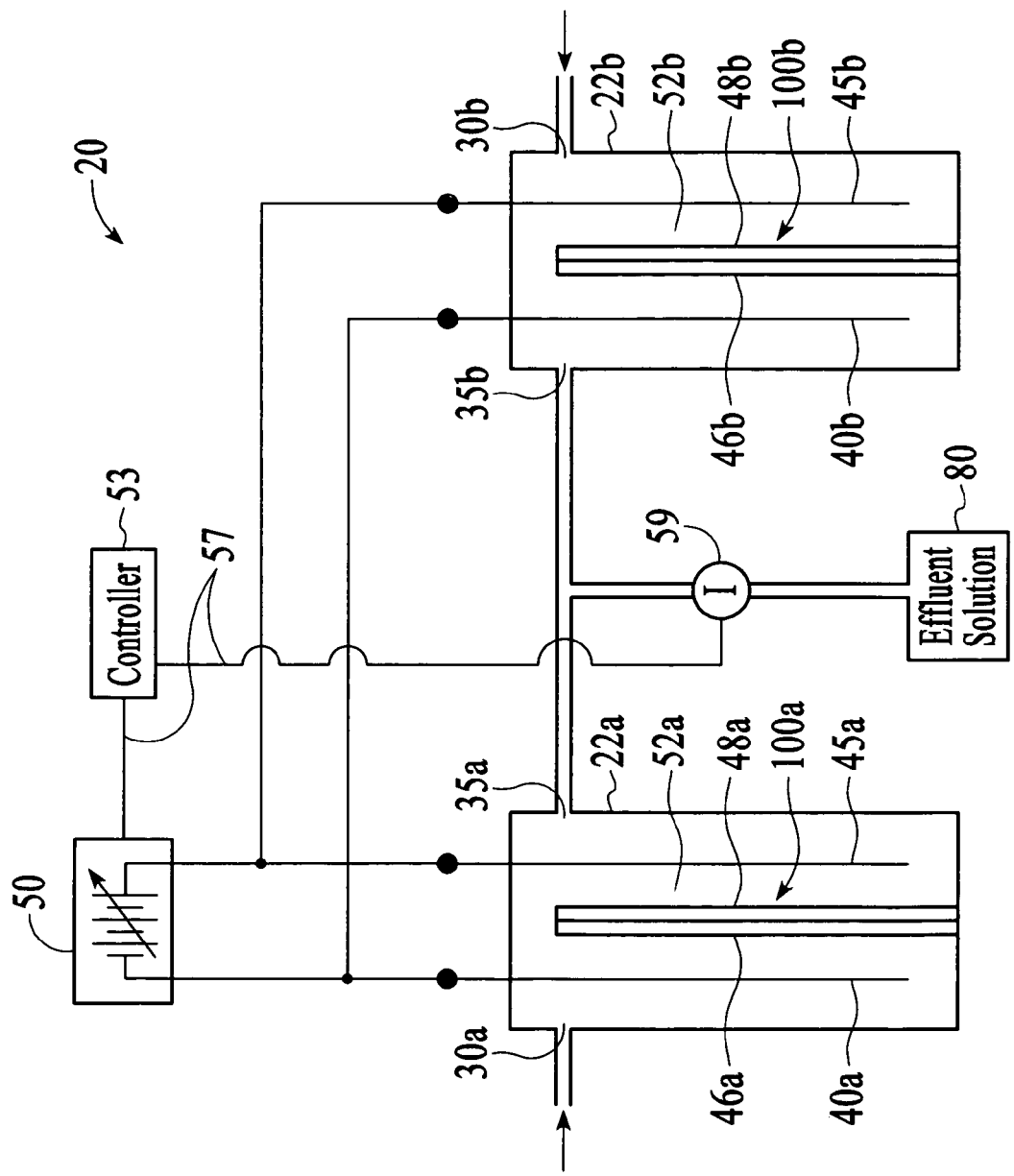
Figure 10B:
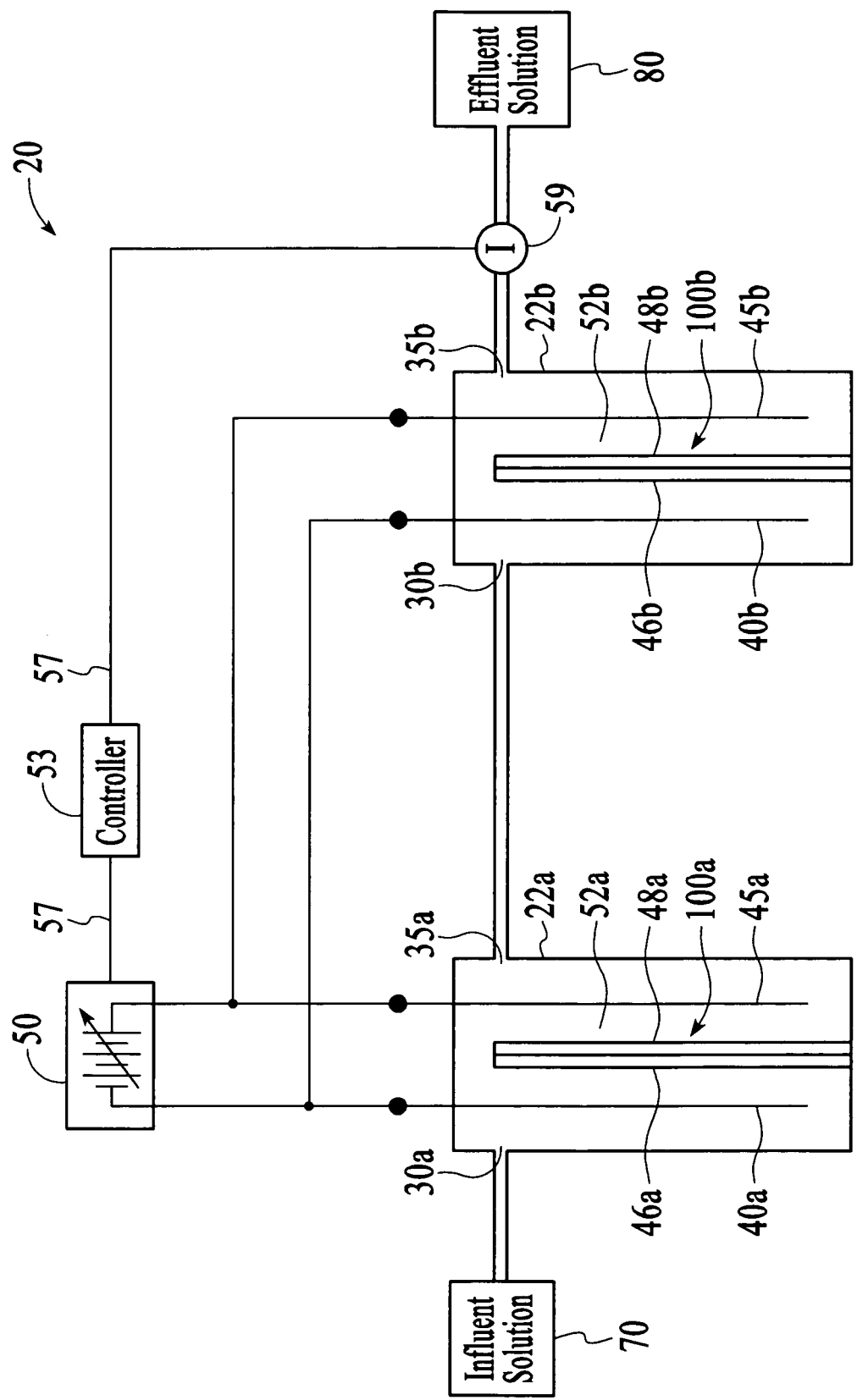
Figure 10C:
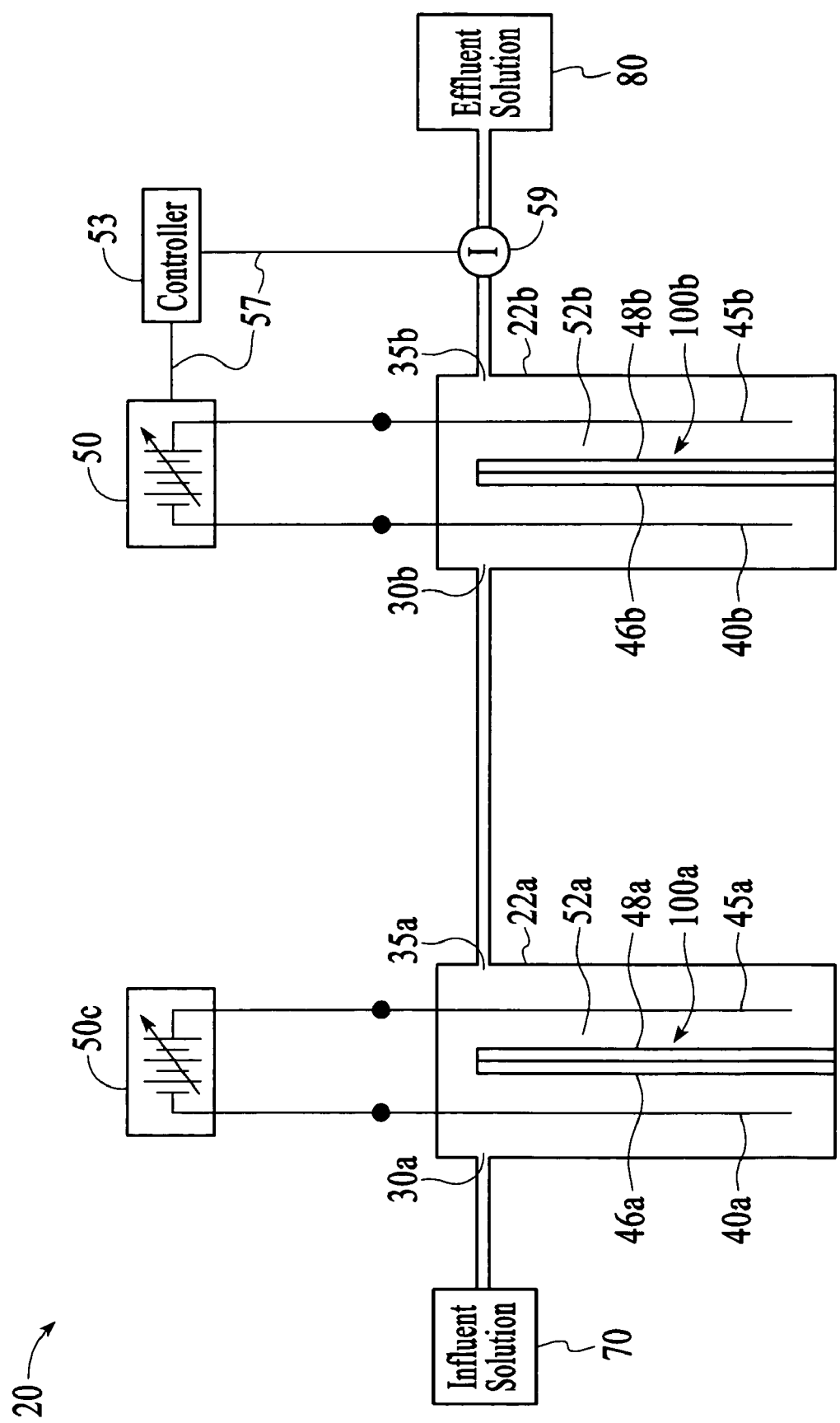
Figure 11:
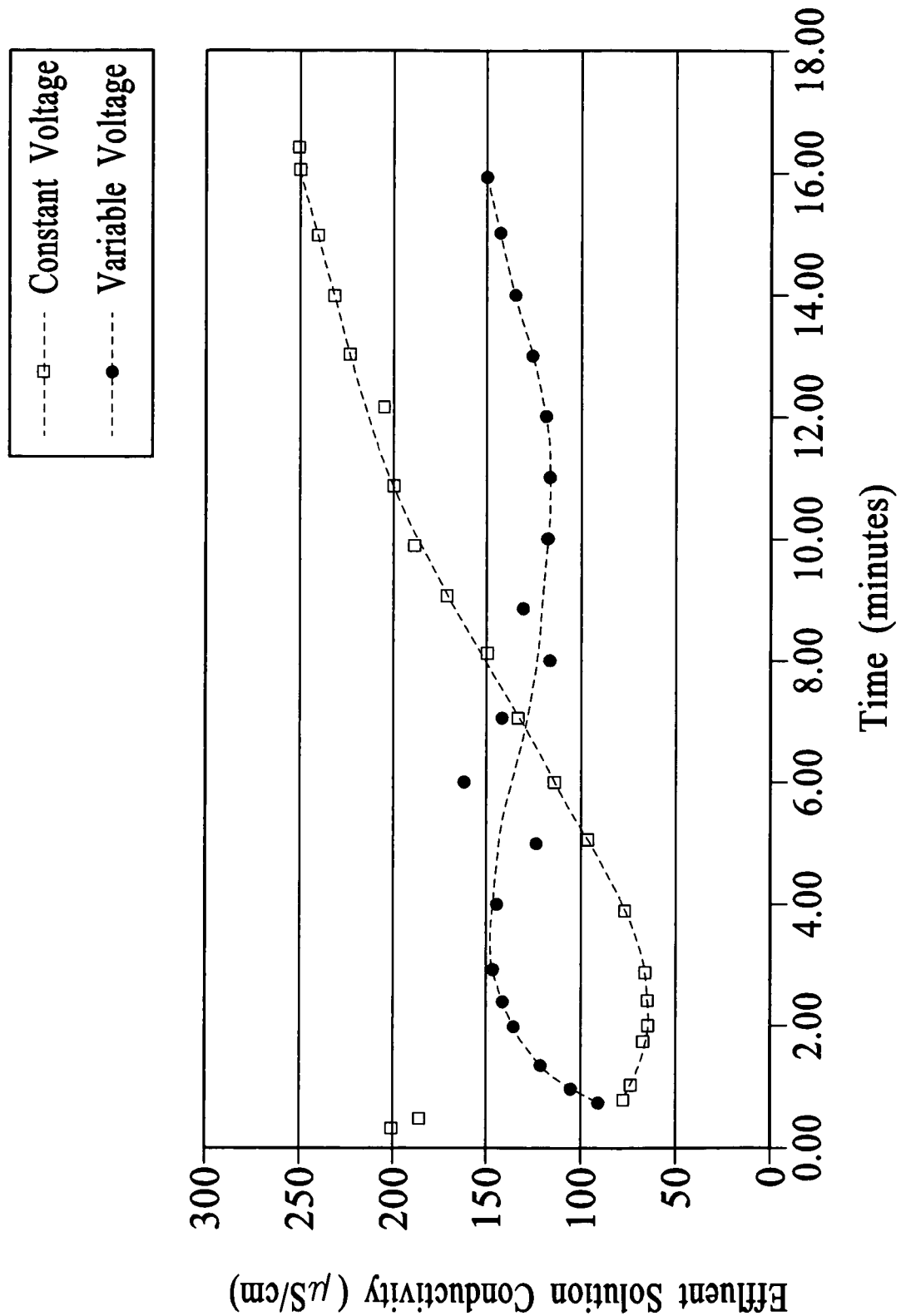

FIGS. 6a-c are graphs showing exemplary input AC voltage and DC output voltage waveforms produced by the phase control voltage supply of FIG. 5;

FIG. 7a is block diagram of a switching voltage supply with pulse width modulation;

FIGS. 7b and c are graphs showing an input AC voltage signal and an output duty cycle modulated DC voltage generated by the voltage supply of FIG. 7a;

FIG. 8 is a circuit diagram of a switching DC voltage supply 90;

FIG. 9 is a schematic sectional view of an embodiment the apparatus that uses current and voltage measurements to control the voltage applied to the electrodes of a cell;

FIG. 10a is an embodiment of the present invention comprising two cells connected in parallel;

FIG. 10b is an embodiment comprising two cells connected in series;

FIG. 10c is an embodiment comprising two cells connected in series, and employing constant voltage and a variable voltage power supplies; and FIG. 11 is a graph that shows the comparative conductivity levels obtained for effluent solutions treated with a constant voltage level (constant voltage) or a variable voltage level (variable voltage).

DESCRIPTION

Figure 1:
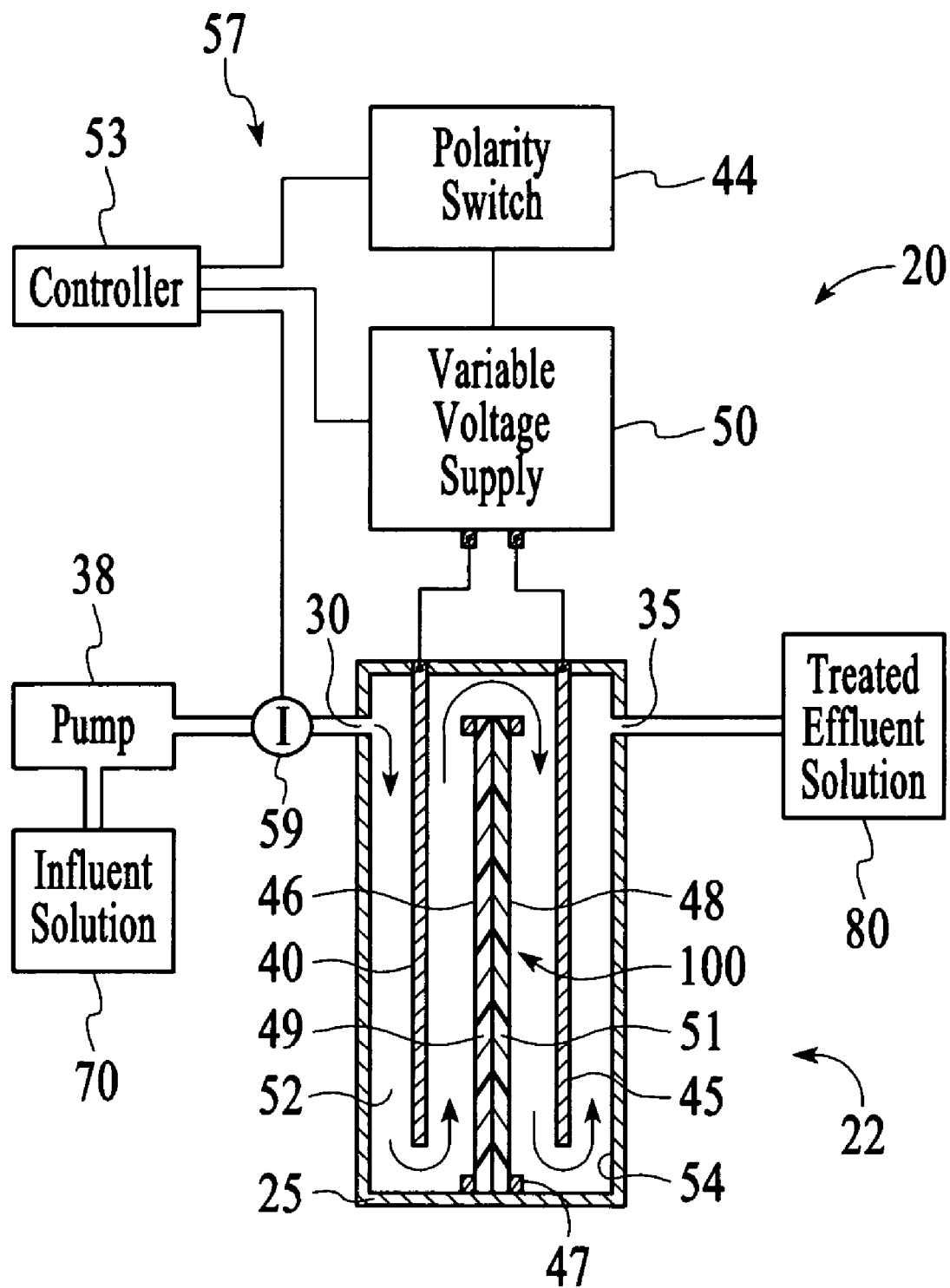
FIG. 1 is a schematic sectional side view of an embodiment of the apparatus of the present invention illustrating an electrolytic ion exchange cell, power supply and control system.

An embodiment of the present apparatus 20 is capable of treating an influent solution comprising ions to extract, replace, or add ions to generate an effluent solution having desired ion concentrations. Exemplary embodiments of the ion controlling apparatus 20 are provided to illustrate the invention and should not be used to limit the scope of the invention, and alternative cell arrangements and configurations as would be apparent to those of ordinary skill in the art are within the scope of the invention. Generally, the apparatus 20 comprises an electrochemical cell 22 comprising a housing 25 that is an enclosed leak proof structure having at least one influent solution inlet 30 and at least one effluent solution outlet 35, as shown in FIG. 1. A suitable housing 25 typically comprises a plate and frame construction fabricated from metal or plastic. While one or more outlets 35 can be provided, the effluent solution from the housing 25 preferably comprises a single effluent solution stream that is formed before or after the outlet 35, for example in an exhaust manifold that combines the different solution streams. Optionally, a pump 38, such as for example, a peristaltic pump or water pressure in combination with a flow control device can be used to flow influent solution into the inlet 30 of the housing 25.

The housing 25 has first and second electrodes 40, 45 therein. One or more of the electrodes 40, 45 can form a portion of the housing 25, for example an electrically conducting wall of the housing as shown in FIG. 3 or can be a discrete structure such as a free standing plate inside the housing (as shown) in FIG. 1. Typically, the electrodes 40, 45 have conducting surfaces that face one another. The anode and cathode electrodes 40, 45 are fabricated from electrically conductive materials, such as metals which are preferably resistant to corrosion in the low or high pH chemical environments created during positive and negative polarization of the electrodes during operation of the cell 22. Suitable electrodes can be fabricated from corrosion-resistant materials such as titanium or niobium, and can have an outer coating of a noble metal, such as platinum. The shape of the electrodes 40, 45 depends upon the design of the electrochemical cell 22 and the conductivity of the influent solution 70 flowing through the cell 22. A suitable electrode is a flat plate that provides a uniform voltage across its surfaces, and that can have openings to allow influent solution to pass therethrough. In another arrangement, the electrodes 40, 45 are shaped as spirals, discs, or even conical shapes.

Figure 2:
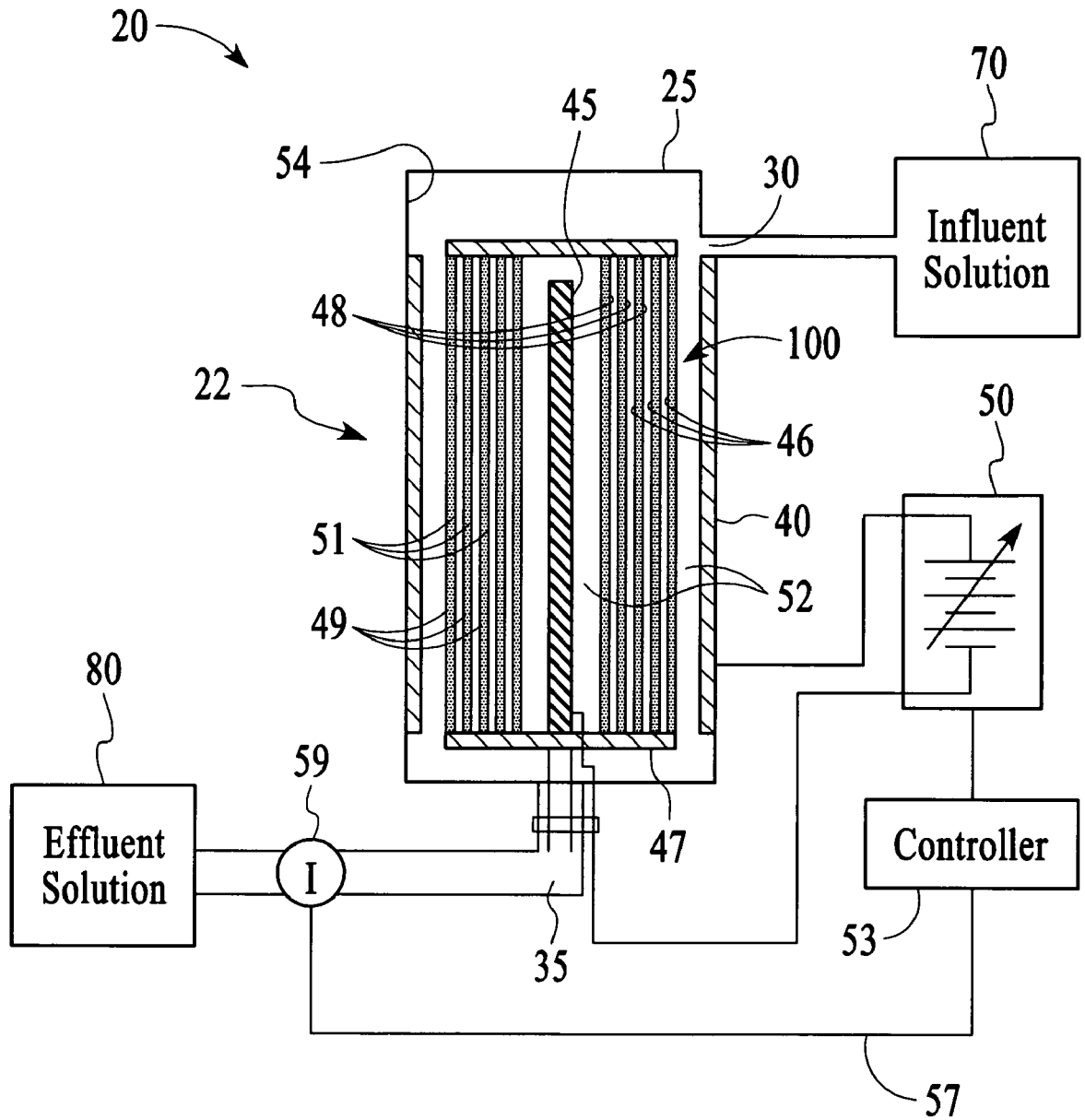
FIG. 2 is a sectional view of sectional side view of another embodiment of the apparatus having an electrolytic ion exchange cell comprising a spiral membrane.

A water-splitting ion exchange membrane 100 is between the first and second electrodes 40, 45, the membrane 100 comprising an anion exchange surface 46 facing the first electrode 40, and a cation exchange surface 48 facing the second electrode 45 as shown in FIG. 1, or vice versa as shown in FIG. 2. The water-splitting membrane 100 can comprise abutting anion and cation layers 49, 51, respectively, contained in an open frame 47 positioned between the electrodes 40, 45, or can be arranged in a spiral configuration as shown in FIGS. 2 and 3. Suitable anion exchange layers 49 of water-splitting membrane 100 comprise one or more basic functional groups capable of exchanging anions such as —$NR_3A$, —$NR_2HA$, —$PR_3A$, —$SR_2A$, or $C_5H_5NHA$ (pyridine), where R is an alkyl, aryl, or other organic group and A is an anion (e.g., hydroxide, bicarbonate, chloride, or sulfate ion). The choice of anion exchange functional group also depends on the application. In water deionization, —$NR_3A$ is preferred for its ability to impart good membrane swelling, and thus provide low electrical resistances and high mass transport rates, over a wide range of pH. Weak base groups are preferred when particularly efficient regeneration is required. For example, —$NR_2HA$ will react with $OH^-$ in a very favorable reaction to form —$NR_2$, $H_2O$, and expel $A^-$. Suitable cation exchange layers 51 can comprise one or more acidic functional groups capable of exchanging cations such as —COOM, —$SO_3M$, —$PO_3M_2$, and —$C_6H_4OM$, where M is a cation (e.g., hydrogen, sodium, calcium, or copper ion). Cation exchange materials also include those comprising neutral groups or ligands that bind cations through coordinate rather than electrostatic or ionic bonds (for example pyridine, phosphine and sulfide groups), and groups comprising complexing or chelating groups (e.g., those derived from aminophosphoric acid, aminocarboxylic acid, and hydroxamic acid). The choice of cation exchange functional group depends upon the application of the cell 22. In water deionization for which the non-selective removal of ions is required, —$SO_3M$ groups are preferred for their ability to impart good membrane swelling, high mass transport rates, and low electrical resistances over a wide range of pH. For the selective removal of copper ion from a liquid containing other ions, for example sodium ion, ion exchange groups such as —COOM or a chelating group such as aminocarboxylic acid are preferred. These weak acid groups offer the additional benefit of particularly efficient regeneration due to the strongly favorable reaction of —$(COO)_nM$ with $H^+$ to form —COOH and expel $M^{+n}$, where M is a metal ion.

The water-splitting ion exchange membranes 100 can also comprise more than two anion and cation exchange layers 49, 51. For example, the water-splitting membrane 100 can have two cation exchange layers and two anion exchange layers. Each two cation or anion exchange layer differs in ion exchange capacities or ion exchange functional groups. For example, a first inner cation exchange layer of water-splitting membrane 100 may comprise substantially —$SO_3$ groups and an outer cation layer can comprise —COOH groups; while the inner anion exchange layer comprises —$NR_3$ groups and the outer anion layer comprises —$NR_2H$ groups. The anion and cation exchange layers can also be porous to hold solution, for example, an open cell foam or other structure, to provide faster solution transport through the water-splitting ion exchange membrane.

A solution channel 52 in the housing 25 allows influent solution 70 from the inlet 30 to flow past both the anion and cation exchange surfaces 46, 48 of the water-splitting ion exchange membrane 100 to form the effluent solution 80 at the outlet 35. The flow path of solution channel 52 can be defined by the housing 25 and the structures in the housing 25. For example, the channel 52 can be formed between the surfaces of the water-splitting membranes 100, the electrodes 40, 45, and the sidewalls 54 of the housing 25, as shown in FIG. 1. The channel 52 can also be a tubular walled structure in the housing (not shown). The solution channel 52 extends from the inlet 30 to outlet 35 where it outputs treated effluent solution 80.

An alternative embodiment of the electrochemical cell 22 comprises a first electrode 40 that forms an outer electrode structure and a second electrode 45 that forms a central electrode structure, as shown in FIG. 2. The water-splitting membrane 100 comprises a plurality of anion and cation exchange layers 49, 51 that are positioned between the two electrodes 40, 45. The membrane layers 49, 51 are arranged in the housing 25 so that the cation exchange surfaces 48 of the membranes face the first electrode 40, and the anion exchange surfaces 46 of the membranes face the second electrode 45. The membranes layers 49, 51 form a spiral wrapped configuration with a spacer 43 which separates the cation surfaces 48 from the anion surfaces 46 and provides a solution channel 52, as shown in FIG. 3. Any number of membranes 100 may be wrapped in parallel in this way to provide the desired pressure drop through the cell 22. For example, three membranes 100 can be spiral wrapped in a parallel arrangement. Spacers 43 can also be positioned within the solution channel 52. The spacers 43 can be, for example, layers of plastic netting material suspended form the sidewalls 54 of the cell. The spacers 43 can be used to separate the water-splitting membranes 100, provide more uniform flow, or create turbulence in the solution channel 52 to provide higher ion transport rates. If two or more water-splitting membranes 100 are in direct contact, excess current may flow through this low resistance path, overheating the membranes 100 and bypassing the solution (thereby reducing cell performance). The spacers 43 can have openings sized 10 μm or higher in diameter.

The method of operation of the electrochemical cell 22 will be illustrated for the treatment of an influent solution comprising sodium chloride and for treatment of an influent solution comprising copper sulfate, in the cell 22 shown in FIGS. 2 and 3. Although operation of a cell 22 is illustrated with respect to these two selected examples, it should be understood that the cell 22 and apparatus 20 can be used for many other applications, and should not be limited to the examples provided herein. In the first example, sodium chloride is removed and concentrated from the influent solution. The electrochemical cell 22, as shown in FIG. 2, comprises water-splitting membranes 100 having sulfonate cation exchange layers 51 and quaternary ammonium anion exchange layers 49. In the first step of the process, ion removal, a first electrode 40 facing the cation exchange layer 51 is positively charged (the anode), and the second electrode 45 is negatively charged (the cathode). At the interface between the cation and anion exchange layers 51, 49 of the water-splitting ion exchange membranes 100, water in the solution stream is split into its component ions $H^+$ and $OH^-$, and $OH^-$ migrates through the cation exchange surfaces 48 toward the first (positive) electrode 40 while $H^+$ migrates through the anion exchange surfaces 46 toward the second (negative) electrode 45. In this step, $Na^+$ diffuses and migrates through the cation exchange surfaces 48 in the direction of the negative electrode. The reactions occurring in the cation exchange layers 51 are:

$$P-SO_3H + Na^+ = P-SO_3Na + H^+ \quad (1)$$

$$H^+ + OH^- = H_2O \quad (2)$$

where "P" refers to the polymer or solid support to which the ion exchange group is attached. The OH⁻ produced by the water-splitting reaction and migrating through the cation exchange surfaces 48 reacts with H⁺ to form water. The consumption of H⁺ maintains the electric and concentration gradients which promote the rate of removal of Na⁺ from solution.

Within the anion exchange layer 49, Cl⁻ diffuses and migrates through the anion exchange layer 49 in the direction of the positive electrode. The reactions occurring in the anion exchange layers 49 are:

$$P-NR_3OH + Cl^- = P-NR_3Cl + OH^- \quad (3)$$

$$H^+ + OH^- = H_2O \quad (4)$$

Analogous to the situation in the cation exchange layer 51, the H⁺ produced by the water-splitting reaction reacts with OH⁻ to promote the rate of removal of Cl⁻ from solution.

While the ion removal step can be performed without voltage (or current), ion removal rates are substantially slower due to the absence of the migration and chemical neutralization effects described above. Without voltage the irreversible water-splitting reaction does not occur, and thus neutralization reactions (2) and (4) cannot take place. Ion removal rates are then governed exclusively by the diffusion rates of Na⁺, H⁺, Cl⁻, and OH⁻ through the cation and anion exchange layers 51, 49.

After the ion exchange groups within the water-splitting membrane's cation and anion exchange layers 51, 49 are fully occupied by Na⁺ and Cl⁻ ions, respectively, a regeneration process step is required to return the water-splitting ion exchange membranes 100 to their original chemical form prior to reactions (1) to (4). In this step, a solution stream 70 is introduced into the cell 22, as for example, the same sodium chloride solution treated in the first step, and the polarity of the electrodes is reversed so that the first electrode 40 is now the negative electrode and the second electrode 45 is the positive electrode. In this step, H⁺ produced by the water-splitting reaction moves through the cation exchange layer 51 in the direction of the negative electrode causing reaction (5):

$$P-SO_3Na + H^+ = P-SO_3H + Na^+ \quad (5)$$

Similarly, OH⁻ produced in the water-splitting reaction moves through the anion exchange layer 49 in the direction of the positive electrode, causing reaction (6) to occur:

$$P-NR_3Cl + OH^- = P-NR_3OH + Cl^- \quad (6)$$

The Na⁺ and Cl⁻ replaced by H⁺ and OH⁻ in the cation and anion exchange layers 51, 49 combine to form NaCl in the effluent solution stream 80. By controlling the solution flow rate during this regeneration step, a concentration of NaCl substantially higher than was present in the incoming solution stream 70 during the ion removal step can be produced. If ion removal in reactions (1) to (4) was intended to deionize a solution stream, then the NaCl concentrate formed during reactions (5) and (6) is discarded. If the purpose of NaCl removal in this apparatus was to isolate this salt, then the NaCl concentrate is saved for further processing.

The operation of this exemplary cell 22 will be described in the context of the removal and subsequent concentration of CuSO₄ from a solution. Any suitable ion exchange materials can be used in the cation and anion exchange layers 51, 49 of the water-splitting membranes 100. For example, the cation exchange layers 51 may comprise P—COOH groups, and the anion exchange layers 49 may comprise P—NR₂H groups. During ion removal, OH⁻ produced in the water-splitting reaction again moves through the cation exchange layers 51 toward the positive electrode, and reactions (7) and (8) occur within the cation exchange layers 51:

$$P-COOH + OH^- = P-COO^- + H_2O \quad (7)$$

$$2P-COO^- + Cu^{+2} = (P-COO)_2Cu \quad (8)$$

Cu⁺² cannot replace H⁺ in P—COOH directly due to unfavorable thermodynamics, and thus reaction (7) is required to remove H⁺ from P—COOH, forming P—COO⁻ which readily reacts with Cu⁺².

In the anion exchange layers 49, H⁺ produced in the water-splitting reaction moves through the anion exchange layers 49 toward the negative electrode, causing reactions (9) and (10) to occur:

$$P-NR_2 + H^+ = P-NR_2H^+ \quad (9)$$

$$2P-NR_2H^+ + SO_4^{-2} = (PNR_2H)_2SO_4 \quad (10)$$

Reaction (9) forms an ionic group from the neutral P—NR₂, enabling the subsequent reaction with SO₄⁻² in reaction (10).

When ion removal is complete, the cation and anion exchange layers 51, 49 are returned to their condition prior to ion removal by flowing the same or a different solution through the cell 22 and reversing the polarity of the electrodes 40, 45. H⁺ produced in the water-splitting reaction now moves through the cation exchange layers 51, resulting in reaction (11):

$$(P-COO)_2Cu + 2H^+ = 2\ P-COOH + Cu^{+2} \quad (11)$$

and OH⁻ produced in the water-splitting reaction moves through the anion exchange layers 49, resulting in reaction (12):

$$(P-NR_2H)_2SO_4 + 2OH^- = 2P-NR_2 + 2H_2O + SO_4^{-2} \quad (12)$$

Both reactions (11) and (12) are thermodynamically favorable, allowing the concentration of CuSO₄ in the solution stream. In a subsequent step, the copper and/or sulfate may be recovered from the solution stream or discarded.

The method of replacing ions in an ion exchange material illustrated in the two preceding examples may be described in general terms as follows. The water-splitting membranes 100 comprise ion exchange layers A and B, one a cation exchange layer 51 and the other an anion exchange layer 49, which layers contain ions $I_{1A}$ and $I_{1B}$, respectively. An ion-containing solution electrically connects the electrodes 40, 45 and the water-splitting membranes 100, and upon application of a sufficient voltage to the two electrodes 40, 45, water at the interfacial region between ion exchange layers A and B is "split" into its component ions H⁺ and OH⁻. This phenomenon, referred to as the "water-splitting reaction," involves the spontaneous dissociation of water into component ions H⁺ and OH⁻ (dissociation occurs with or without the electric field), followed by the migration of these ions into ion exchange layers A and B under the influence of the electric field. H⁺ migrates toward the negative electrode, and OH⁻ toward the positive electrode. As the H⁺ and OH⁻ migrate into layers A and B, more water diffuses to the interfacial region to continue the water-splitting reaction cycle. As H⁺ and OH⁻ move through ion exchange layers A and B, they cause the replacement of ions $I_{1A}$ and $I_{1B}$ by ions $I_{2A}$ and $I_{2B}$ from the solution, respectively. This replacement of ions in ion exchange layers A and B may be either a direct replacement, for example H⁺ for Na⁺ on a P—SO₃⁻ ion exchange group, or it may be an indirect replacement, for example as occurs when OH⁻ reacts in a first step with P—COOH to form P—COO⁻, followed by reaction to bind Cu⁺².

The apparatus 20 further comprises a variable voltage supply 50 to maintain the first and second electrodes 40, 45 at a plurality of voltage levels during an ion exchange stage. The voltage bias levels are selectable voltage levels that have different magnitudes during the ion exchange stage. For example, the voltage levels can be time averaged voltage levels that are each a fixed constant voltage level or fixed pulsed voltage level, during a pre-specified time period that is a portion of the time period of an ion exchange stage, such as (i) a solution treatment step, for example, a deionization or ion removal step in which ions are removed from the influent solution 70 to form the effluent solution 80, or (ii) a membrane regeneration step or ion rejection step in which the membrane 100 is regenerated by expelling or replacing ions in the membrane, (ii) but not both. The ion removal step is a pass of the influent solution across the anion and cation surface 46, 48 of the water-splitting membrane 100 in the electrochemical cell 22 to change the ion concentration level in the influent solution 70 by removing or replacing ions from the influent solution 70. The ion rejection step is a regeneration cycle in which the water-splitting membrane 100 is regenerated by expelling or rejecting ions in the membrane 100. In each step, the time averaged voltage level is determined by averaging the magnitude of the voltage applied to the electrodes 40, 45 over a selected time period. The time period is a length of time in which the voltage has a peak absolute magnitude that remains substantially the same.

FIG. 4 shows an exemplary embodiment of variable time averaged voltage levels for an ion removal step (graph (a)) and an ion rejection step (graph (b)). In this figure, the magnitude of the pulsed voltage is plotted over time to show different time cycles in each of which, the time-averaged voltage is maintained at one level. Graph (a) demonstrates a variable time averaged voltage applied to the electrode that has a first magnitude ($V_1$) that remains substantially the same over a first time period ($T_1$), a second first magnitude ($V_2$) that remains substantially the same over a second time period ($T_2$), a third magnitude ($V_1$) that remains substantially the same over a third time period ($T_3$), etc. Curve (b) shows a time averaged voltage having a reversed polarity with negative values of voltages ($V_4$) ($V_5$) ($V_6$) that are used during different time periods ($T_4$) ($T_5$) ($T_6$) of an ion rejection step. In each step, the time average voltage generates a time averaged electric field in the cell of different field strengths. The varying electric field has a field strength proportional to the different applied voltage levels. It should be noted that in the ion rejection step, the voltage can also remain substantially constant over the entire cycle, since the objective is only to expel ions from the membrane 100.

In one version, the variable voltage supply 50 provides a time modulated or pulsed direct current (DC) voltage having a single polarity that remains either positive or negative, during an ion removal step, or during an ion rejection step. In contrast, a non-DC voltage such as an alternating current (AC) supply voltage, has a time-averaged AC voltage that would be approximately zero. Employing one polarity over the course of either an ion removal (deionization) or ion rejection (regeneration) step in the operation of the electrolytic ion exchange cell 22 allows ions in the influent solution 70 being treated to travel in a single direction toward or away from one of the electrodes 40, 45, thereby providing a net mass transport of ions either into or out of the water-splitting membranes 100. The magnitude of the average DC voltage is obtained by mathematically integrating the voltage over a time period and then dividing the integral by the time period. The polarity of the integration tells whether one is in ion removal or rejection mode, and the magnitude of this calculation is proportional to the electrical energy made available for ion removal or rejection. A reasonable estimate of this integrated value is obtained from the time-averaged measurement observed with a slow response DC voltmeter, for example, a voltmeter with a characteristic response time in the tens of seconds, such as 20-30 milliseconds. The voltage supply 50 can also includes a polarity switch 44 to switch polarity to the electrodes 40, 45, for example, to either momentarily add ions to solution to maintain a desired concentration in the solution in the cell 22 during the ion removal step, or to regenerate the membrane 100 in the cell 22 to prepare for a subsequent ion deionization step.

The variable voltage supply 50 can provide a variable DC voltage or current by full-wave or half-wave rectification of an AC voltage. Such a voltage supply can be, for example, (i) a phase control voltage supply 50a, or (ii) a switching voltage supply with pulse width modulation 50b. These circuits and descriptions are only two examples of how to provide a variable time-modulated DC voltage, and other variable DC voltage supply circuits apparent to those of ordinary skill in the art can also be employed. An embodiment of a phase control voltage supply 50a using phase control thyristors (SCR) 81 is illustrated in FIG. 5. The phase control voltage supply 50a can provide linear or unregulated power. The voltage supply 50a operates on conventional single phase AC power 82 (120 volts, 60 Hz) as shown in FIG. 6a, inputted directly into back-to-back SCRs 81 that rectify the AC into DC. Besides rectification, the SCRs 81 are also able to switch from non-conducting to conducting very rapidly. When an AC power source 82 is switched by an SCR 81, the current is turned off every time the current drops to zero using the zero crossing trigger 91 that operates in combination with the trigger transistor 89. FIG. 6a shows an input AC cycle signal 72 of an SCR 81 that is triggered into conduction at a trigger point (t) that is about 2 milliseconds after the AC cycle crosses zero voltage. At that point the SCR 81 turns on and remains on until the alternating wave crosses a zero voltage level. The back-to-back SCRs 81 function as full-wave rectifiers whose voltage output would be represented by the dotted line 76 in FIG. 6b. FIG. 6c shows the resulting waveform comprising a variable magnitude pulsed DC voltage 78, which is then provided to the electrodes 40, 45 of the cell 22. In the phase control voltage supply 50a, the SCRs 81 are turned on by an optotriac trigger SCR 83 and their timing determined by an RC circuit 84 comprising a 555 and 4066 control chips. The trigger occurs at a set time delay after the zero crossing 85 which is determined by varying the resistances 86 in RC timing circuit 84. Continuous variation in the output voltage can be accomplished by using a potentiometer. This circuit 50a uses fixed resistors 86 to set six (or some other number) of discrete time delays to trigger the SCRs 81 at particular points in the alternating voltage phase thus setting five discrete output voltages at the output leads 87, for example, 0 (off), 30, 100, 200, 300 volts.

In embodiment of a phase control voltage supply 50a illustrated in FIG. 5, there are a number of standard components, such as resistors, capacitors, diodes and transistors. Suitable values and part numbers that may be used for these components include: $C_1=C_2=250$ µF(250V), $C_3=0.01$ µF(50V), $C_4=0.1$ µF(25V), $D_1$ and $D_2$ are T6A1002, $Q_1$ and $Q_2$ are 2N6507 (SCRs), $R_2=100$ Ω, $R_4=1$ kΩ, $R_7=20$ kΩ$R_8=22$ kΩ, $R_9=28$ kΩ, and $R_{14}=14$ kΩ. The above-listed values and components are only exemplary and different values or components can be used.

An alternative variable voltage supply 50 comprising a switching voltage supply with pulse width modulation 50b is illustrated in the block diagram of FIG. 7a. Given the input signal in FIG. 7c, FIG. 7b illustrates the output of the voltage supply 50b. There is only one voltage level because the DC voltage or current power is controlled by varying the duty cycle, which is the ratio of on-time to off-time of the voltage. A version of the switching voltage supply 50b that is a switching DC voltage supply 90, is illustrated in FIG. 8. In the voltage supply 90, the AC power is rectified by unregulated DC rectifier and filter 93 before being transformed into a higher frequency and voltage. The modulator and inverter 94 uses a pulse width modulator 92 to regulate the voltage applied to the high frequency transformer 99. The feedback loop compares the sampling feedback voltage 95 with a reference voltage 96 and controls the duty cycle of the primary transistor 98 to control the output voltage 97.

The apparatus 20 can also include an ion sensor 59 to measure an ion concentration of the solution and generate a solution ion concentration signal. The ion sensor 59 can measure, for example, concentration, species type, or a ratio of concentrations of different ions. In one version, the ion sensor 59 is a conductivity sensor, which is useful to determine and control total dissolved solids (TDS) concentration in the treated effluent solution 80. Alternatively, the ion sensor 59 can be a sensor specific to a particular ionic species, for example nitrate, arsenic or lead. The ion specific sensors can be for example, ISES (ion selective electrodes).

The location of the ion sensor 59 in the solution stream is selected depending on the nature of the ion concentration signal that is desired. The ion sensor can be used to (i) measure an ion concentration of the influent solution, at least partially treated solution, or effluent solution, and (ii) generate an ion concentration signal, and In one version, the ion sensor 59 is placed in the at least partially treated solution after the influent solution 70 has passed across at least some of the cation and anion surfaces 48, 46 of the water-splitting membrane 100. For example, the ion sensor 59 can be placed near in the effluent solution stream beyond the effluent outlet 35, as shown in FIG. 2. In this version, the ion concentration signal represents the concentration of an ion, or ions, in the treated solution, and is used to adjust or regulate the ion extraction efficiency of the cell 22 to obtain a desired ion concentration in the cell 22.

A controller 53 receives the signal from the ion sensor 59 via a feedback circuit loop 57 and sends a control signal to the variable voltage supply 50 to control the voltage output to the electrodes 40, 45. The controller 53 comprises electronic circuitry and program code to receive, evaluate, and send signals. For example, the controller 53 can comprise (i) a programmable integrated circuit chip or a central processing unit (CPU), (ii) random access memory and stored memory, (iii) peripheral input and output devices such as keyboards and displays, and (iv) hardware interface boards comprising analog, digital input and output boards, and communication boards. The controller can also comprise program code instructions stored in the memory that is capable of controlling and monitoring the electrochemical cell 22, ion sensor 59, and voltage supply 50. The program code may be written in any conventional computer programming language. Suitable program code is entered into single or multiple files using a conventional text editor and stored or embodied in the memory. If the entered code text is in a high level language, the code is compiled, and the resultant compiler code is then linked with an object code of pre-compiled library routines. To execute the linked, compiled object code, the user invokes the object code, causing the CPU to read and execute the code to perform the tasks identified in the program.

The controller 53 receives an ion concentration signal from the ion sensor 59 and sends a control signal to the variable voltage supply 50 to adjust the voltage level provided by the voltage supply 50 to the electrodes 40, 45. The signal sent by the controller 53 to the voltage supply 50 instructs the voltage supply 50 to adjust a time averaged voltage level applied to the electrodes 40, 45 in response to the signal from the ion sensor 59. For example, the controller 53 can send a voltage control signal to the voltage supply 50 to adjust the time averaged voltage level provided by the voltage supply 50 to achieve a predefined ion concentration range in the effluent solution 80, as described below. The controller 53 can also send a control signal to the variable voltage supply 50 to select the degree of power modulation or duty cycle of the time averaged voltage level.

A method of controlling ion or TDS concentration using the cell 22 shown in FIG. 2, will be described using a measurement of the ionic conductivity of the treated effluent solution 80 by an ion sensor 59 comprising an ion conductivity sensor located just exterior to the outlet 35 of the cell 22. Assuming an influent solution 70 having a conductivity of 1000 µS/cm (~500 ppm TDS) enters the cell 22 at inlet 30, that a desired conductivity of the treated solution 130 is 200 µS/cm (~100 ppm TDS), and that the cell 22 is initially powered at 100 V. As influent solution 70 passes through the cell 22, cations are extracted by the ion exchange layers having surfaces 48 and anions are extracted by the ion exchange layers having surfaces 46. The ion sensor 59 measures a lower ionic conductivity of the effluent solution 80 exiting the cell 22 via outlet 35 that represents a reduced TDS concentration and generates a proportional ion concentration signal. The measured ion concentration signal is relayed to the controller 53, which in turn sends a control signal to the variable voltage supply 50 by feedback loop 57. If the measured conductivity of the effluent solution 80 is lower than the desired level of 200 µS/cm, then the controller 53 sends a control signal to the variable power supply 50 to reduce the applied voltage. If the measured conductivity is greater than the desired level, then the controller 53 sends a control signal to the variable power supply 50 to increase the voltage. The controller 53 can contain a programmed microprocessor or program code to adjust the voltage to a proportional level based upon the difference between the target and measured ionic conductivity. If the measured conductivity is nearer the target, the control signal instructs the variable voltage supply 50 to apply smaller voltage changes; and if measured conductivity is further from the target, the control signal instructs the voltage supply 50 to apply larger voltage changes. For example, if the measured ion concentration using the apparatus of FIG. 1 is a specific ion, for example nitrate, then the controller 53 can send a control signal to the variable power supply 50 containing instructions to adjust voltage to a predetermined level to decrease of increase the concentration of this specific ion.

In another version, the ion sensor 59 is located in the influent solution 70 as far upstream as possible to obtain the earliest measurement of ion concentration in the influent solution 70, as for example, shown in FIG. 1. It may also be located before the influent inlet 30 or interior to the cell 22 in a location that allows the desired sensing of the ion content of the influent solution 70 before it is treated by the water-splitting membrane 100. In this location, the ion sensor 59 generates an ion concentration signal that is indicative of the ion sensor 59. The earlier the ion sensor 59 measurement can be determined in this embodiment, the more precisely can the ion concentration of the treated solution be controlled. The ion sensor 59 measures an ion concentration of the influent solution 70 and generates an influent ion concentration signal relating to the influent ion concentration. The controller 53 receives the influent ion concentration signal and sends a control signal to the variable voltage supply 50 to adjust the time-averaged voltage level in response to this signal. Feedback loop 57, controller 53 and variable voltage supply 50 adjust the voltage to cell 22 in response to the control signal to increase the voltage if the influent solution 70 contains a larger concentration of ions or to decrease the voltage if the influent solution 70 contains a smaller concentration of ions.

When the influent ion composition or concentrations are known and predictable over time, the controller 53 can also be preset to issue control signals that instruct the voltage supply 50 to pass predefined selected time average voltages during an ion removal or rejection step of the cell 22. In this example, the controller 53 is preprogrammed with knowledge of the application, namely, the composition of the influent solution 70 and/or the behavior of cell 22 over time or with the input volume of the influent solution 70. The ion sensor 59 and feedback loop are absent. Controller 53 instructs variable supply 50 to adjust the voltage to cell 22 as a function of time or volume without an ion sensor 59 or closed loop control to sense a change in the ion concentration of the influent or effluent solutions 70, 80.

In yet another version, the electrical resistance of cell 22 is used to determine or predict the conductivity of the effluent solution 80, as shown in FIG. 9, to control TDS in the effluent without controlling specific ion concentrations. In this version, the apparatus 20 comprises a voltmeter 62 to measure the voltage bias in the cell 22 and generate a voltage signal and an ammeter 60 to measure the current in the cell 22 and generate a current signal. The controller 53 receives a voltage signal from the voltmeter 62 and the current signal from the ammeter 60 and calculates an ion concentration in the solution from the ratio of the voltage and current signals. The ratio of current/voltage represents the electrical resistance of the cell 22 and is an indicator of the conductivity of the solution in the cell 22, and thus a predictor of the effluent solution conductivity. Feedback loops 57 from the ammeter 60 and voltmeter 62 provide the signals to controller 53 to allow the controller 53 to adjust the applied voltage to the cell 22 to maintain the ion concentration at a desired level. The measured cell resistance is a sum of water and membrane resistances, and thus controller 53 can also interpret the signals from feedback loops 57 to account for changes in the membrane electrical resistance over time. In operation, the current/voltage ratio measurement is used to estimate ion concentration, and the controller 53 sends a control signal to the variable voltage supply 50 to adjust voltage in response to the measured current/voltage ratio.

Instead of a single cell 22, the apparatus 20 can also comprise a plurality of cells 22 with solution inlets 30 and outlets 35 fluidly connected in a parallel or series arrangement. For example, an arrangement comprising two cells 22a,b that have their influent inlets 30a,b connected in parallel is shown in FIG. 10a. In this arrangement, the influent water stream is split into two streams each of which provided to an influent inlet 30a,b of a separate cell 22a,b. The effluent solution exits at each of the cell's outlets 35a,b and is recombined prior to passing through or past an ion sensor 59. The voltage supply 50 powers both cells 22a,b in parallel. The signal from ion sensor 59 is carried to controller 53 by feedback loop 57 and the variable voltage supply 50 is adjusted accordingly in response to instructions in a control signal from the controller 53. This version is useful for operation at lower pressures or higher flow rates.

In yet another arrangement, two or more cells 22 are fluidly connected in series, with the influent solution entering a first cell 22a at inlet 30a, exiting the first cell's outlet 35a, entering the inlet 30b of a second cell 22b, exiting at the second cell's outlet 35b, and finally passes past the ion sensor 59, as shown in FIG. 10b. The electrodes 40a,b, 45a,b of both cells 22a,b can be connected in parallel to a single voltage supply 50, or each cell can have a separate voltage supply 50. The controller 53 receives a signal from an ion sensor 59 relating to the ion content of the sequentially treated solution and controls the voltages applied to the electrodes 40a,b, 45a,b in each cell 22a,b to control ion removal in each cell 22a,b. In the version shown in FIG. 10c, the first cell 22a is power by a constant voltage supply 50c that provides a single constant voltage to the cell 22a, and the second cell 22b is powered by a variable voltage supply 50. The ion sensor 59 is located in the treated effluent solution 80 outside outlet 35b of the second cell 22b. In this embodiment, cell 22a provides maximum deionization as a pretreatment for the influent solution of the second cell 22b, where the ion content of the cell is controlled to achieve desired ion levels. Ion sensor 59, feedback loop 57, controller 53, and variable voltage supply 50 allow adjustment only of the voltage to cell 22b and not cell 22a.

EXAMPLE 1

Constant Voltage

This example demonstrates the loss in ion removal efficiency of a water splitting ion exchange membrane 100 over an ion removal cycle. A cell 22 comprising a spiral wound water-splitting membrane 100 in a cylindrical housing 25 was employed for a TDS content reduction experiment. A constant voltage power supply with a current limit of 1 A was used so a feedback circuit was not employed. The cell 22 comprised 30 layers of membrane 100 between a central electrode and an outer electrode. The cation exchange layer 51 of the membrane 100 faced outward and the anion exchange layer 49 inward. Initially, the cell 22 was regenerated by an ion rejection step for 20 minutes at 160 ml/min and 300 V using a feed water stream of ~50 μS/cm to prepare it for the deionization or ion removal step. During the regeneration step, the current to the electrodes 40, 45 was maintained at 0.5 to 1.0 amps, and the influent solution 70 was flowed from the inside to the outside of the spiral membrane 100 in the cell 22.

Subsequently, in a deionization or ion removal step, the influent solution flow direction and polarities of the time averaged voltage applied to the electrodes 40, 45 of the cell 22 were reversed. Influent solution 70 comprising water with dissolved solids or ions and having an initial ionic conductivity of 504 µS/cm was pumped through the cell 22 at 1.5 liters/minute. The voltage applied to the electrodes 40, 45 was the maximum voltage available from the variable voltage power supply 50, namely, 300 V limited to 1 Amp maximum current. The result is shown in the graph of FIG. 11, as the constant voltage curve in which full power was applied throughout the ion exchange cycle. The early high conductivity is due to purging the last regenerant solution from the cell 22 for the first 30 seconds, followed by a fairly stable conductivity output for 4 minutes, then a steady increase in effluent water conductivity occurred to 250 µS/cm at 16 minutes, when the experiment was stopped. This example demonstrates that the ion content in the effluent solution 80 gradually increased over time as the water splitting membrane 100 became saturated with ions removed from the influent solution 70. Consequently, the ionic concentration of the effluent solution 80 did not remain constant during the treatment cycle, but instead varied by a factor of 5 corresponding to an increase in conductivity from 150 to 250 µS/cm.

EXAMPLE 2

Variable Voltage

In this example, the apparatus 20 comprised the cell 22 of Example 1 having an ion sensor 59 that was a conductivity sensor that was connected to a controller 53 comprising a microprocessor to interpret the ion concentration signal and control the output voltage of a variable voltage supply 50. The target ionic conductivity in this experiment was 125 µS/cm. Previous experiments determined the output voltages, which would be employed for various deviations of the ionic conductivity of the effluent solution 80 from the target conductivity. The result is presented in FIG. 11 as the variable voltage curve. When the measured conductivity exceeded the 125 µS/cm target, the controller 53 increased the voltage to the cell 22, and the conductivity of the effluent 80 was reduced soon thereafter. The slow variation up and down for the effluent solution 80 is a result of the finite response time of the system. This is largely dependent on the flow rate and void volume of the cell 22. It is evident that the effluent solution conductivity is controlled in this illustration to 125±25 µS/cm for a full 16 minutes, or 24 liters of treated solution. In contrast, the full (or single) power experiment in Example 1 provided treated effluent solution 80 in this target range for only 3 minutes, or for only 4.5 liters of volume.

The present apparatus 20 and methods allow treatment of influent solutions 70 to provide a selected or controlled ion concentration in the effluent solution 80. For example, they can provide a treated effluent solution 80 comprising water having controlled concentration of ions most suitable for a particular purpose, whether it be taste for drinking water, hardness for softened water, or a particular TDS content for an industrial process. The present invention can also extend the working capacity of the deionization cycles of electrolytic ion exchange devices by avoiding the over-deionization of water, thereby preserving ion exchange capacity for further water treatment. By employing variable voltages rather than chemical systems, the complexity of the apparatus 20 is reduced, as is the capital and operating cost. Furthermore, the influent and effluent solutions avoid the risk of cross-contamination, which can occur when bleeding solutions to control ion concentrations. The apparatus 20 also provides good ion selectivity, resistance to mineral scale fouling, and concentrated regenerant effluent solutions typical of conventional ion exchange.

The present invention has been described in considerable detail with reference to exemplary versions thereof, however, other versions are possible, as would be apparent to one of ordinary skill in the art. For example, other arrangements of electrochemical cells can also be used depending on the influent ion concentration, volume, or treatment desired. Also, alternative voltage supplies can be designed to provide voltages suitable for other applications, for example, a single polarity voltage having an AC component. Further, relative terms, such as first, second, outer, inner are provided only to illustrate the invention and are interchangeable with one another, for example, the first electrode can be the second electrode. Therefore the spirit and scope of the appended claims should not be limited to the description of the preferred versions contained herein.

What is claimed is:

1. An apparatus to treat an influent solution comprising ions to obtain a selectable ion concentration in a resultant effluent solution, the apparatus comprising:
    (a) an electrochemical cell comprising:
        (i) a housing comprising first and second electrodes;
        (ii) a water-splitting ion exchange membrane between the first and second electrodes, the membrane comprising (i) a cation exchange surface facing the first electrode, and (ii) an anion exchange surface facing the second electrode; and
        (iii) an influent solution inlet and an effluent solution outlet with a solution channel therebetween, the solution channel allowing the influent solution to flow past both the anion and cation exchange surfaces of the water-splitting ion exchange membrane and thereby form the effluent solution; and
    (b) a variable voltage supply capable of maintaining the first and second electrodes at a plurality of selectable voltage levels during an ion exchange stage such that each selectable voltage level has a different magnitude and provides a different ion concentration range in the effluent solution.

2. An apparatus according to claim 1 wherein the voltage levels are time averaged voltage levels.

3. An apparatus according to claim 2 wherein the time averaged voltage levels each have a different magnitude but substantially the same polarity.

4. An apparatus according to claim 2 wherein the ion exchange stage comprises an ion removal step.

5. An apparatus according to claim 2 wherein the ion exchange stage comprises an ion rejection step.

6. An apparatus according to claim 1 wherein the variable voltage supply is a phase control voltage supply.

7. An apparatus according to claim 1 wherein the variable voltage supply provides a variable magnitude pulsed voltage.

8. An apparatus according to claim 1 wherein the variable voltage supply comprises a switching voltage supply with pulse width modulation.

9. An apparatus according to claim 1 wherein the variable voltage supply provides a fixed magnitude pulsed voltage.

10. An apparatus according to claim 1 comprising a voltmeter to measure the voltage bias in the cell and generate a voltage signal, an ammeter to measure the current in the cell and generate a current signal, and a controller which determines the ion concentration in the solution from the ratio of the voltage and current signals and sends a control signal to the variable voltage supply to adjust the voltage level applied to the electrodes in response to the ion concentration.

11. An apparatus according to claim 1 comprising:
(1) an ion sensor to (i) measure an ion concentration of the influent solution, at least partially treated solution, or effluent solution, and (ii) generate an ion concentration signal, and
(2) a controller to receive the ion concentration signal and send a control signal to the variable voltage supply to adjust the voltage level in response to the ion concentration signal.

12. An apparatus to treat an influent solution comprising ions to obtain a selectable ion concentration in an effluent solution, the apparatus comprising:
(a) an electrochemical cell comprising:
  (i) a housing comprising first and second electrodes;
  (ii) a water-splitting ion exchange membrane positioned between the first and second electrodes, the membrane comprising (i) a cation exchange surface facing the first electrode, and (ii) an anion exchange surface facing the second electrode; and
  (iii) an influent solution inlet and an effluent solution outlet with a solution channel therebetween, the solution channel allowing the influent solution to flow past both the anion and cation exchange surfaces of the water-splitting ion exchange membrane and thereby form the effluent solution;
(b) an ion sensor to measure an ion concentration in the influent solution, at least partially influent solution, or effluent solution, and generate an ion concentration signal;
(c) a variable voltage supply to maintain the first and second electrodes at a plurality of different selectable voltage levels during an ion exchange stage such that each selectable voltage level has a different magnitude and provides a different ion concentration range in the effluent solution; and
(d) a controller to receive the ion concentration signal from the ion meter and send a control signal to the variable voltage supply to adjust the voltage level applied to the first and second electrodes in response to the ion concentration signal to achieve a predefined ion concentration range in the effluent solution.

13. An apparatus according to claim 12 wherein the variable voltage supply is capable of providing voltage levels that are time averaged voltage levels during the ion exchange stage.

14. A method of treating an influent solution comprising ions to control the concentration of ions in an effluent solution, the method comprising:
(a) flowing the influent solution past both anion and cation exchange surfaces of a water-splitting ion exchange membrane to form the effluent solution;
(b) maintaining a time averaged electric field across the cation and anion exchange surfaces of the water-splitting membrane; and
(c) varying the strength of the time averaged electric field during ion exchange of the influent solution by selecting one of a plurality of selectable voltage levels that each have a different magnitude to control the ion concentration of the effluent solution.

15. A method according to claim 14 wherein the strength of the time averaged electric field is varied to achieve a predefined ion concentration range in the effluent solution.

16. A method according to claim 14 comprising measuring an ion concentration of the at least partially treated influent solution and varying the strength of the time averaged electric field in response to the measured ion concentration.

17. A method according to claim 14 comprising varying the strength of the time averaged electric field by varying the time-averaged voltage level of a variable-magnitude pulsed voltage applied to electrodes about the cation and anion exchange surfaces of the water-splitting membrane.

18. A method according to claim 14 comprising varying the strength of the time averaged electric field by varying the duty cycle of a fixed-magnitude pulsed voltage level applied to electrodes about the cation and anion exchange surfaces of the water-splitting membrane.

19. A method according to claim 14 comprising measuring the voltage and current through the solution and water-splitting membrane and determining an ion concentration in the solution from the ratio of the voltage and current measurements.

20. A method of treating an influent solution comprising ions to control the concentration of ions in an effluent solution, the method comprising:
(a) flowing the influent solution past both anion and cation exchange surfaces of a water-splitting ion exchange membrane to form the effluent solution;
(b) maintaining a time averaged electric field across the cation and anion exchange surfaces of the water-splitting membrane; and
(c) setting the strength of the time averaged electric field during ion exchange of the influent solution by selecting one of a plurality of selectable voltage levels that each have different magnitude and provide a different ion concentration range in the effluent solution.

21. A method according to claim 20 comprising measuring an ion concentration of at least partially treated influent solution and varying the strength of the time averaged electric field in response to the measured ion concentration.

22. A method according to claim 20 comprising varying the strength of the time averaged electric field by varying the time-averaged voltage level of a variable-magnitude pulsed voltage applied to electrodes.

23. A method according to claim 20 comprising varying the strength of the time averaged electric field by varying the duty cycle of a fixed-magnitude pulsed voltage level applied to electrodes.

24. A method according to claim 20 comprising measuring the voltage and current through the solution passing across the water-splitting membrane and determining an ion concentration in the solution from the ratio of the voltage and current measurements.

* * * * *